United States Patent [19]

Lovely

[11] 4,149,180

[45] Apr. 10, 1979

[54] BURST GATING SIGNAL GENERATING CIRCUIT

[75] Inventor: John D. Lovely, Batavia, N.Y.

[73] Assignee: GTE Sylvania Incorporated, Stamford, Conn.

[21] Appl. No.: 863,133

[22] Filed: Dec. 22, 1977

[51] Int. Cl.[2] .............................................. H04N 9/46
[52] U.S. Cl. ...................................... 358/20; 328/139
[58] Field of Search ..................... 358/20, 19; 329/138

[56] References Cited

U.S. PATENT DOCUMENTS

| 2,726,282 | 12/1955 | Bigelow | 358/20 |
|---|---|---|---|
| 3,024,305 | 3/1962 | Wolfe | 358/20 |
| 3,544,708 | 12/1970 | Buechel | 358/20 |

Primary Examiner—John C. Martin
Attorney, Agent, or Firm—John A. Odozynski

[57] ABSTRACT

Disclosed herein are a circuit and a method for providing an appropriately-timed signal to the input of a chrominance burst gate. Horizontal synchronizing pulses are differentiated and clipped so that positive-going, exponentially decaying pulses are developed substantially coincidentally with the chrominance burst signal. The resultant pulses are then applied to one terminal of a switch. Horizontal flyback pulses are phase-delayed so that their peak amplitude occurs during the burst period. The phase-delayed pulses are applied to another terminal of the switch so that resultant pulses are shorted to ground except during a predetermined portion of the horizontal flyback period. As a result, a burst gating signal having a pulse width effectively equal to and coincident with the burst signal period is generated and applied to the input of the burst gate.

10 Claims, 2 Drawing Figures

BURST GATING SIGNAL GENERATING CIRCUIT

FIELD OF THE INVENTION

This invention relates to chrominance processing circuitry in general and more particularly to the generation of a burst gating signal for the accurate extraction of the chrominance burst signal from the composite video waveform.

BACKGROUND OF THE INVENTION

Color television receivers use the 3.58 MHz chrominance burst signal, generated by the transmitter, to synchronize and otherwise condition the receiver's locally-generated chrominance reference oscillator. Because only approximately eight cycles of the burst signal are provided on the "back-porch" of the horizontal synchronizing pulse, it is desirable to "gate" the burst signal so that only it, and not spurious signals or noise components, are allowed to reach the chrominance processing stages.

Historically this has been done by using the horizontal flyback pulse as the burst gating signal, relying on its coincidence with the burst period. Such systems have proved less than ideal because, inter alia, the horizontal flyback pulse typically has a width of approximately 13 microseconds, whereas the period of the burst signal is in the neighborhood of 2 microseconds. Furthermore, because of errors in the free-running frequency of the receiver's horizontal oscillator, there may be as much as a ±4 microseconds difference between the occurrence of the synchronizing pulses and the flyback pulses. As a result, the burst gate pulsewidth is necessarily made wider than the burst duration, to the detriment of the chrominance control characteristics of the receiver. This is especially evident when the first microsecond or so of an active line is allowed to pass through the burst gate. The reference oscillator will then possess an error component related to the signal that has erroneously passed through the burst gate. The color content of the picture will vary with the error component.

A more accurate burst gating pulse can be derived from the trailing edge of the horizontal sync pulse. In one form, the horizontal sync pulses can be differentiated and used to open the burst gate. However, because a differentiating circuit necessarily has the characteristics of a high-pass filter, noise pulses received with the composite video signal will also open the burst gate, thereby introducing erroneous information into the chrominance reference channel.

OBJECTS OF THE INVENTION

It is an object of this invention to develop an accurately-timed burst gating signal.

It is a further object of this invention to develop such a signal in a manner that maintains the noise immunity of the burst gate.

It is a further object of this invention to insure that erroneous signals do not enter the chrominance reference channel, thereby degrading the performance of the television receiver.

SUMMARY OF THE INVENTION

The above and other objects, advantages and capabilities are achieved in one aspect of the invention by a burst gating signal generating circuit which comprises circuitry for differentiating and clipping the horizontal sync pulses so as to develop single-polarity, exponentially-decaying pulses. These pulses are then applied to one terminal of a switch which has a second terminal coupled to ground. Horizontal flyback pulses are delayed and coupled, substantially coincidentally with the occurrence of the chrominance burst signal, to a third terminal of the switch so that the switch provides an appropriately-timed burst gating signal to the input of a burst gate.

DETAILED DESCRIPTION OF THE PREFERRED EMBODIMENT

Figure 1:
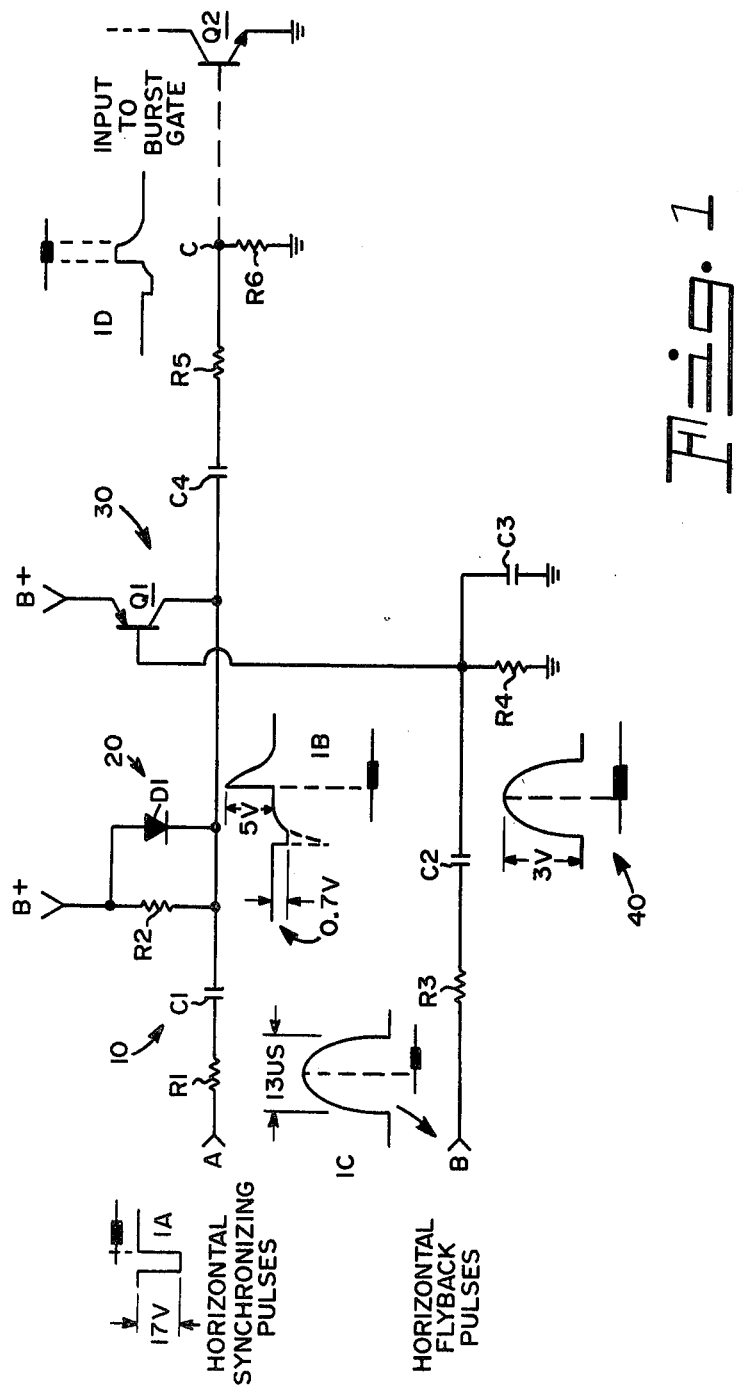
FIG. 1 is a schematic diagram of the subject invention, showing significant waveforms developed therein. The shaded rectangular areas in waveforms 1A-1D represent the chrominance burst period and are intended to illustrate the relationship between those waveforms and the chrominance burst signal.

For a better understanding of the present invention, together with other and further objects, advantages and capabilities thereof, reference is made to the following disclosure in conjunction with the accompanying drawings.

As illustrated in waveform 1A, a source of horizontal synchronizing (Sync) pulses is coupled to an input terminal A of a differentiating circuit 10. The differentiating circuit comprises a series-connected resistor R1 and capacitor C1, connected, in turn, to a resistor R2 and coupled to a source of potential voltage B+. R2 is connected in parallel with a clipping circuit 20 in the form of a diode D1, having an anode connected to B+ and a cathode connected to the junction of R2 and C1.

As shown in waveform 1B, circuit 10 differentiates each sync pulse to form a negative-going pulse and a positive-going pulse. As the negative-going pulse approaches B+ −0.7 volt, D1 becomes conductive, thereby clipping the negative excursion to approximately B+ −0.7 volt. Because D1 is back-biased by the positive-going pulses, these pulses are left substantially intact. As will be shown below, the width of the positive-going pulse determines the length of time the burst gate will be open; accordingly its width is preferably in the neighborhood of the burst signal period, approximately (assuming 8 cycles of burst) 8/3.58 microseconds. Persons skilled in the art are aware that the effective width of the positive pulse is determined by the magnitude of the sync pulses and the RC time-constant of the differentiating circuit.

The resultant differentiated and clipped sync pulses are coupled to a first terminal of a switching means 30, that is, the collector of transistor Q1. Means 30 has a second terminal, the emitter of Q1, connected to ground through B+, and a third terminal, the base of Q1, connected to a phase-delaying and biasing means 40.

Means 40 has an input terminal B coupled to source of horizontal flyback pulses which occur during the horizontal retrace period. As shown in waveform 1C, these pulses have a truncated or half-sinewave waveform with a period of approximately 13 microseconds and, in this embodiment, a peak amplitude of approximately 17 volts. The flyback pulses are AC coupled through a resistor R3 and a capacitor C2 to the base of Q1. The base of Q1 is also coupled, through the parallel combination of a resistor R4 and a capacitor C3, to circuit ground.

Figure 2:
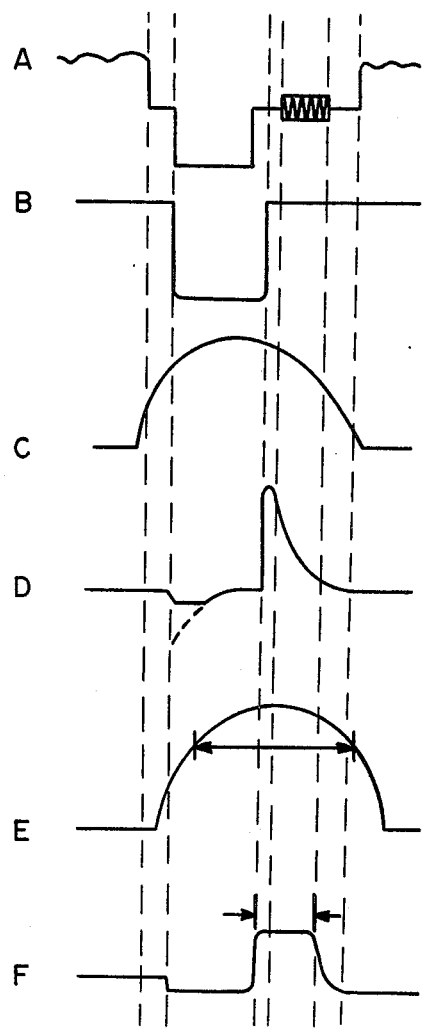
FIG. 2 is a timing diagram showing the temporal relationship of the waveforms depicted in FIG. 1.

R3 and C3 operate to phase-shift the flyback pulses so that the waveform at the base of Q1 is delayed with respect to the waveform at terminal B. Their values are chosen so that the peak amplitude of the flyback pulse at the base of Q1 occurs coincidentally with the start of the chrominance burst period. R4 provides a source of base current for Q1 so that, in the absence of a flyback pulse, that is, during the horizontal scan period, Q1 is saturated and the voltage at its collector, as well as the voltage at the cathode of D1, is clamped at approximately B+, less the saturation voltage of Q1. When saturated, Q1 effectively shorts the resultant sync pulses through B+ to ground. Otherwise these pulses are AC coupled through R5 and C4 to the input of a burst gate illustrated as a transistor Q2. The timing diagram of FIG. 2 shows the manner in which the burst gating signal of waveform 1D is generated and made to be substantially coincident with the chrominance burst period.

Waveform 2A depicts a typical sync pulse at the output of the receiver's composite video detector circuit. Approximately 6-8 cycles of chrominance burst are present on the back porch of the sync pulse. Waveform 2B represents the separated sync pulse as it appears at terminal A. Due to processing within the receiver, the trailing edge of the sync pulse in 2B is somewhat delayed with respect to the pulse of 2A, but still occurs prior to the start of the burst period. Waveform 2C shows the flyback pulse that is applied to terminal B and waveform 2E shows the pulse that is applied to the base of Q1. As pointed out above, by virtue of R3 and C3 the flyback pulse at the base of Q1 has been phase-shifted, or delayed, so that its peak amplitude coincides with the start of the chrominance burst period. The arrowheads in 2E represent the time during which the voltage at the base of Q1 is of sufficient amplitude to assure that Q1 is turned off and the resultant sync pulses are allowed to pass through R5 and C4 to terminal C. Waveform 2D shows the resultant sync pulses at the collector of Q1. Note that, in the absence of the flyback pulse at the base of Q1, Q1 would be saturated and the resultant sync pulses shorted to ground. The leading edge of the positive-going pulse and the trailing edge of the sync pulse occur simultaneously, that is, slightly before the start of the burst period. The differentiating circuit is designed so that the positive-going pulse decays at an exponential rate during the burst period. The waveforms 2D and 2E cooperate to form the burst gating signal waveform, present at terminal C and shown in 2F. The burst gating signal waveform, in essence, represents a logical AND function of the differentiated pulses, 2D, and the delayed flyback pulses, 2E.

The period between the arrowheads indicates the time during which there is a positive voltage at that base of Q2, that is, the time when the burst gate will be open. As can be seen, the gate will be open shortly before the start of the burst period. Although it is shown as closing exactly at the end of the burst period, it may be open for a slightly longer period without an appreciable degradation in performance. As stated above, in order to achieve this result, it is necessary that the differentiating circuit 10 be designed to have the proper RC time constant. For a peak amplitude of the negative-going sync pulses equal to approximately 17 volts and for values of 1K ohm, 150 picofarads, and 12K ohm for R1, C1 and R2 respectively, the differentiating circuit provides a 5-volt positive-going pulse that decays as shown in 2D.

The rate of decay and, hence, the width of the differentiated pulse are critical to the extent that, if the pulse is made to decay too rapidly, a portion of the burst period will be "gated out," thereby degrading the performance of the chrominance processing circuits. Conversely, if the pulse decays too slowly, the burst gate will be open for an excessive period of time and additional, undesired signals, possibly including video information on the subsequent horizontal line, may enter the chrominance processing circuits. However, a salient advantage of the invention disclosed herein is that, as shown in 2E, sometime near the end of the flyback pulse, Q1 will again become saturated, thereby assuring that burst gate will be closed.

Furthermore, although switching means 30 is illustrated in its simplest form, that is, a single PNP transistor, it is obvious that any device or combination of devices that effect a logical "AND" function with respect to the resultant sync pulses and the delayed flyback pulses will be satisfactory. The essential feature is that the burst gating signal be generated only during those intervals when both the resultant sync pulses and the delay flyback pulses are above a predetermined level, thereby obtaining the phase accuracy and noise immunity of each of these signals. For instance, in an alternate embodiment it might be convenient to apply the sync pulses to an input of an analog gate so that they appear at the output only when the flyback pulses are above a sufficient amplitude.

Accordingly, while there has been shown and described what is at present considered the preferred embodiment of the invention it will be obvious to those skilled in the art that various changes and modifications may be made therein without departing from the invention as defined by the appended claims.

What is claimed is:
1. A burst gating signal generating circuit comprising:
  (a) a differentiating circuit having an input coupled to a source of sync pulses;
  (b) a clipping circuit coupled to the differentiating circuit so that pulses of a desired polarity remain substantially intact and pulses of the opposite polarity are clamped at a predetermined amplitude, whereby the resultant pulses comprise the desired polarity pulses decaying at an exponential rate;
  (c) switching means having a first terminal connected to the differentiating circuit and a second terminal coupled to a source of potential;
  (d) a phase-delaying and biasing circuit having an input coupled to a source of flyback pulses and having a source of current coupled to a third terminal of the switching means, said circuit for phase-delaying the flyback pulses and coupling them to the third terminal substantially coincidentally with the burst signal; and
  (e) a coupling circuit connected between the first terminal and an output terminal for providing a burst gating signal to an input of a burst gate.
2. A circuit as defined in claim 1 wherein the differentiating circuit is characterized by an RC time-constant so that the resultant pulses decay at a rate determined by that time constant and so that the effective width of those pulses is substantially equal to the chrominance burst period.
3. A circuit as defined in claim 2 above wherein the phase-delaying and biasing circuit comprises:
  a resistor coupled between the source of flyback pulses and the third terminal of the switching means, and a capacitor coupled between the third terminal and ground so that flyback pulses are delayed in such a manner that their peak amplitude occurs substantially coincidentally with the start of the burst signal period.

4. A circuit as defined in claim 3 wherein the switching means is normally conductive and is rendered non-conductive for those portions of the flyback period during which the amplitude of the flyback pulse is above a predetermined level.

5. A circuit as defined in claim 4 wherein the switching means comprises a transistor having an emitter connected to a source of potential voltage, a collector coupled to the resultant pulses and a base coupled to the phase-delaying and biasing circuit, said biasing circuit comprising a resistor connected between the base of the transistor and ground so that the resultant pulses are normally coupled to the source of potential voltage but, during the presence of portions of the phase-delayed flyback period, are coupled to the input of a burst gate.

6. A circuit as defined in claim 5 wherein the clipping circuit comprises a diode having an anode connected to a source of potential voltage and a cathode connected to the collector of the transistor.

7. In a television receiver that develops a source of horizontal sync pulses and a source of horizontal flyback pulses and processes a chrominance burst signal for the stabalization of the receiver's chrominance reference oscillator, a method of generating a burst gating signal comprising the steps of:

(a) differentiating the sync pulses;

(b) clipping the negative-going portions of the differentiated sync pulses;

(c) coupling the resultant differentiated and clipped sync pulses to a first terminal of a switching means that has a second terminal coupled to ground;

(d) phase-delaying the flyback pulses so that the maximum amplitude of the flyback pulses occur substantially coincidentally with the positive-going portion of the resultant sync pulses;

(e) applying the phase-delayed flyback pulses to a third electrode of the switching means so that the resultant sync pulses are applied to an input of a burst gate during those times when the phase-shifted flyback pulse is at its maximum amplitude and are otherwise shunted to ground.

8. A method of generating a burst gating signal as defined in claim 7 wherein the third terminal of the switching means is coupled through a resistor to the source of flyback pulses and through a capacitor to ground, thereby effecting phase-delay of the flyback pulses.

9. A method of generating a burst gating signal as defined in claim 8 wherein the third terminal of the switching means is connected to a source of bais current so that the switching means normally presents a low impedance between its first terminal and ground.

10. A method of generating a burst gating signal as defined in claim 9 wherein the phase-delayed flyback pulses are applied to the third terminal of the switching means so that the switching means presents a high impedance between its first terminal and ground during the occurrence of the positive-going portions of the resultant sync pulses.

* * * * *